June 20, 1939.　　　　　M. N. FARR　　　　　2,162,805
AIR CONDITIONING APPARATUS
Filed Aug. 7, 1937　　　2 Sheets-Sheet 1
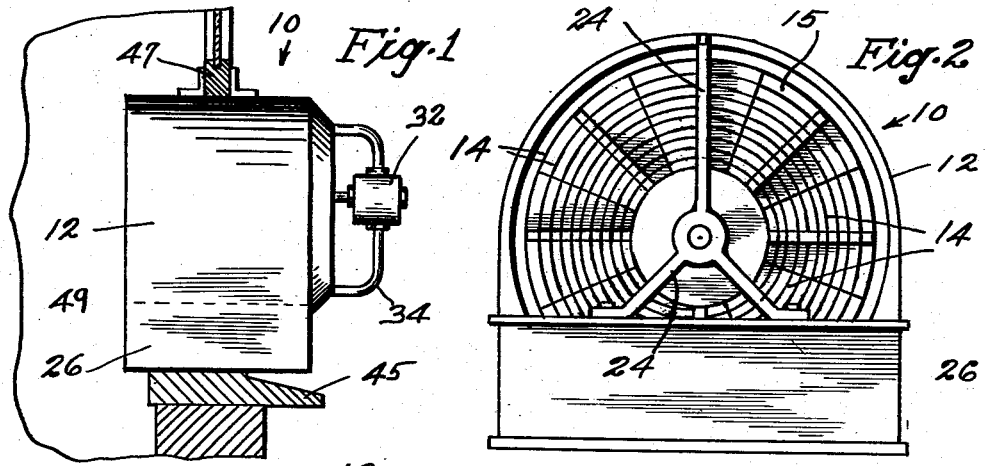
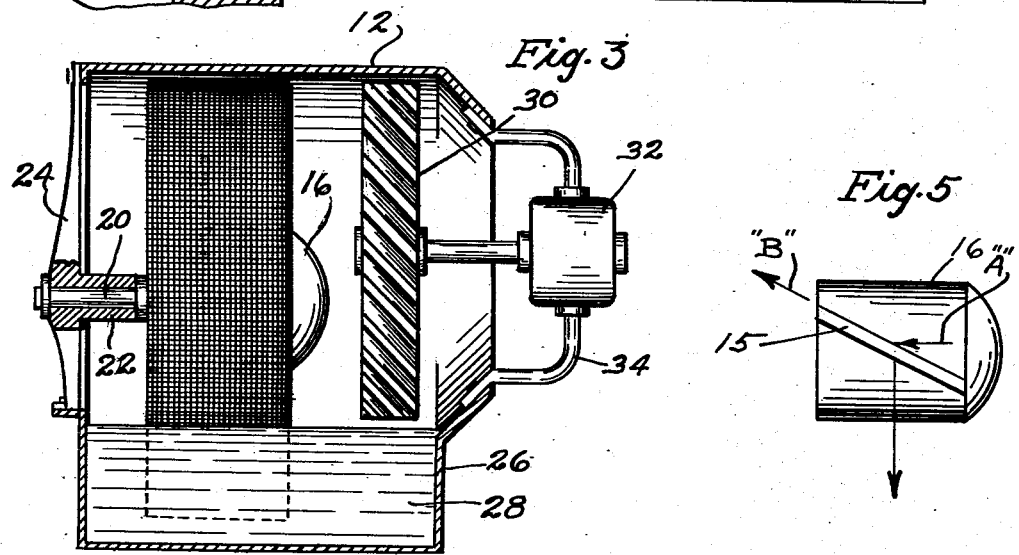
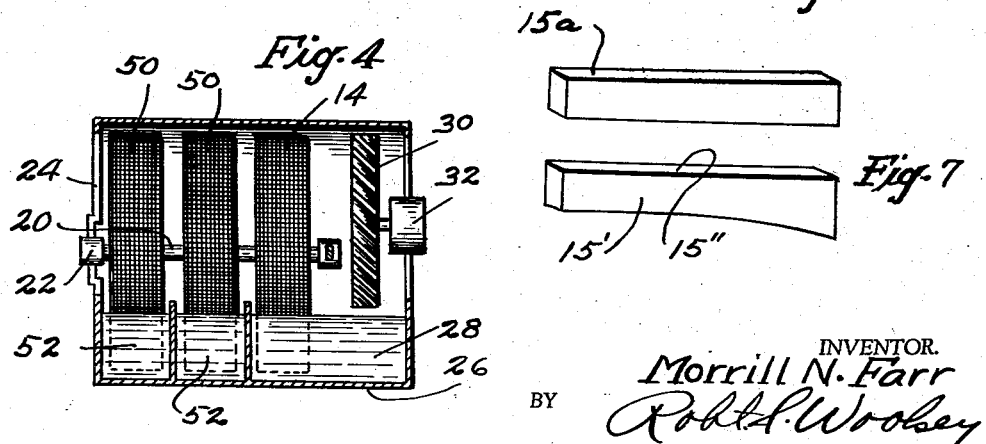
INVENTOR.
Morrill N. Farr
BY Robt. F. Woolsey
ATTORNEY.

June 20, 1939.  M. N. FARR  2,162,805
AIR CONDITIONING APPARATUS
Filed Aug. 7, 1937   2 Sheets—Sheet 2

INVENTOR.
Morrill N. Farr
BY Robt. P. Woolsey
ATTORNEY.

Patented June 20, 1939

2,162,805

UNITED STATES PATENT OFFICE 2,162,805

AIR CONDITIONING APPARATUS

Morrill N. Farr, Los Angeles, Calif., assignor to Temperatair Incorporated, Los Angeles, Calif., a corporation of California Application August 7, 1937, Serial No. 157,953

1 Claim. (Cl. 261—92)

The device of this invention, as the title indicates, has for its object, the provision of novel means to condition air, either in the home or in places of industrial occupation, and to that end provides a plurality of continuously wetted surfaces from which evaporation of moisture takes place and which surfaces are constantly rotated to be rewetted by a moving current of air directed upon the wetted surfaces by a power driven impeller.

Another object of the invention is the provision of a low cost, exceedingly simple and reliable, and readily installed air conditioning apparatus.

Other objects, features and advantages of the invention may be apparent from the accompanying drawings, the specification and the accompanying claim.

In the drawings of which there are two sheets:

Figure 1 is a utility view showing one form of application of the device of the present invention.

Figure 2 is a view in elevation, showing the discharge end of the device of this invention.

Figure 3 is a longitudinal section, partially in elevation, showing the manner in which the spirally placed wetting surfaces dip into the cooling bath, also showing application of an air current from a power driven impeller.

Figure 4 is a schematic view showing the general arrangement of elements employed for cooling and dehumidifying air.

Figure 5 is a view of the hub upon which a screen is spirally wound, also showing one of the spacer-block elements, which when carried to full development, forms one of the vanes used for the dual purpose of spacing turns of the screen, and to effect rotation of the hub by reaction of a current of air directed thereagainst.

Figure 6 is illustrative of spacer blocks used between turns of the screen.

Figure 7 is a view of the base block, that is, the block which rests upon the hub as the first of the spacing elements.

Figure 8:
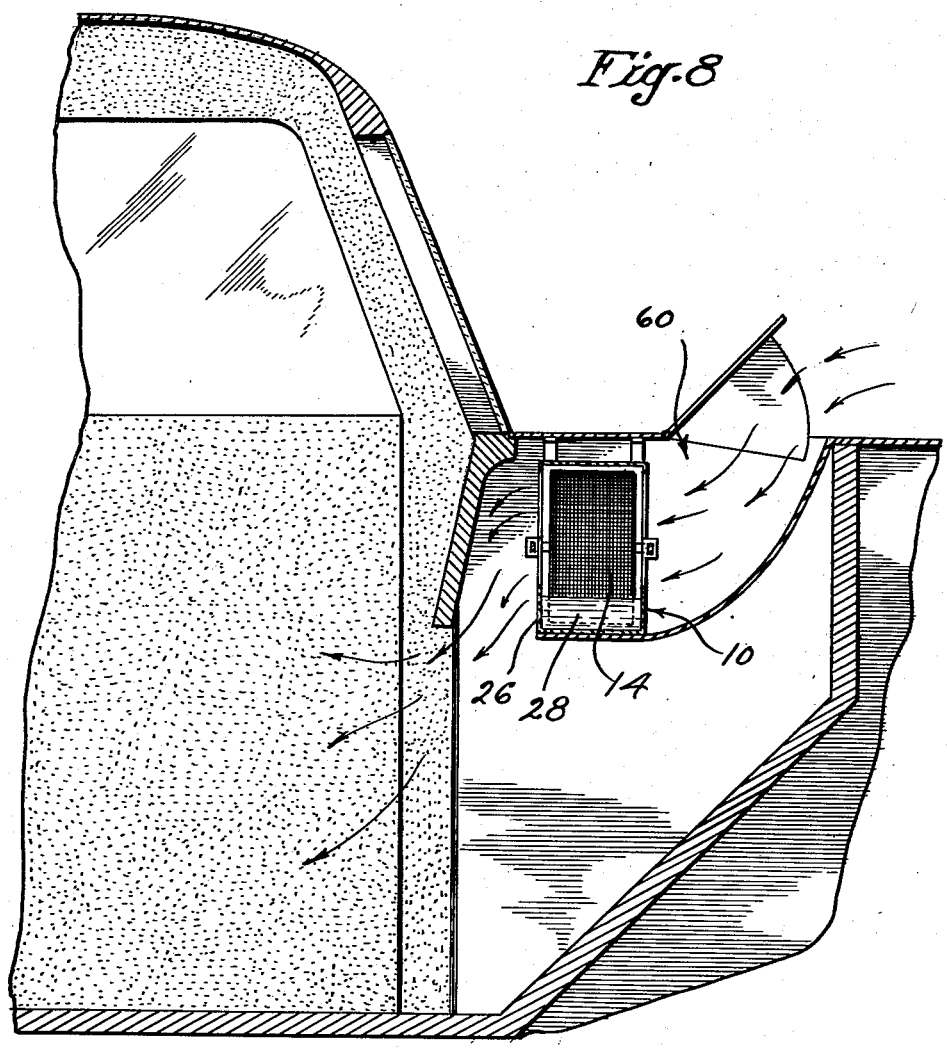
Figure 8 is a view showing a modified form of construction, wherein the rotatable evaporating surface is operably mounted under the cowling of an automobile or other vehicle, wherein the wind created by the forward movement of the vehicle is properly directed as through the cowling ventilator, to drive the evaporating surface in the manner contemplated by this invention.

As shown in the drawings, the device 10 of this invention, includes a housing 12 of suitable configuration, within which I rotatably mount a hub or drum 16 having a plurality of spirally wound turns of wire screen 14.

The hub 16 as a preferred mode of illustrating the base support for the vanes 15, is secured upon a shaft 20 which is free to rotate in a journal 22, formed as a part of a bracket 24 which may be bolted or otherwise suitably secured to the housing 12.

The bottom portion of the housing 12 is provided with, or formed as a receptacle 26 within which I place a quantity of water 28 for the purpose of wetting the spiral turns of wire screen 14 as they rotate with the hub 16 in response to pressure upon the vanes 15 of a current of air moving from a fan or impeller 30, which is driven by a motor 32 suitably mounted upon a bracket 34 or other support, which may be secured to the housing 12, as convenience dictates.

The vanes 15 are built up of separable elements, as shown in Figures 6 and 7. Of these separable spacers, the base element 15' is given such suitable configuration as to enable its bottom surface to rest flush upon, and extend across the hub in such manner as to have a suitable degree of pitch as shown in Figure 5, so that all points upon the top surface 15'' of the base member are equi-distant from the longitudinal axis of the hub. All the others of the spacers, such as element 15a in Figure 6, are rectangular pieces of appropriate length, width, and depth, depending upon the size to which the device 10 is to be built.

In placing the screen 14 upon the hub, it is proposed that the edge of the screen be soldered or otherwise secured to the hub, after which one of the base elements 15' is soldered to the hub 16 and the screen is laid over the base element or spacer 15'. This proceeding is continued until a complete turn is effected, then one of the rectangular spacers 15a is placed immediately over the first of the base spacers 15', the screen 14 being then placed over spacer 15a. The foregoing operation is continued until a rotatable screen of sufficient diameter has been formed. During the screen winding operation, all of the spacing elements may be soldered or otherwise secured in position to form a rigid structure. That is, the base spacing elements 15' may be soldered to the hub 16, the screen 14 is soldered to the element 15', and the spacers 15a are soldered upon the top surface of the screen 14, in alignment of course with the spacer in the next lower position.

In Figure 5 I show, or rather include a vector illustration of the application of forces to effect rotation of the revoluble assembly of hub, screen and vanes. Here the arrow A represents the direction of an incoming air current from the impeller 30, and which as it strikes the vane 15 at a rather sharp angle of incidence, results in an outward movement of the air in a direction indicated by the arrow B, or in the direction of a room 49, see Figure 1. However a certain portion of the energy of the air current is absorbed in work, and results in rotation of the revoluble assembly, the constant rotation of which brings dry or partially dry screen surfaces to be immersed in the water 28, while that portion of the wetted screen upon emergence from the water is subject to the evaporating action of the current of air moving over the screen.

In Figure 4, I show in diagrammatic form, a modification of the device previously described. The device here shown includes means to dehumidify the air after having passed over the wetted screen 14.

This I accomplish by rotatably mounting one or more series of screens 50 in such a manner that they are rotated in the manner of the screen 14, by the current of air exhausted from the impeller 30, and which rotation causes the screen 50 to dip into a solution of a deliquescent substance 52 of proper gravity. This construction effects dehumidification of the air after it passes over screen 14, by reason of the air having been impinged upon the screen 50, which, as previously stated has been dipped into or coated with a deliquescent substance, such as calcium chloride.

Application of the invention is simple and believed to be readily understood. The device may be installed, as shown in Figure 1, between a window sill 45 and a rail 47 to wash and cool the air of a room 49, or it may be installed in such manner as to wash and cool air, which is then conducted into a room or rooms through conduits, not shown in the drawings, the use or application of which is well understood in the air conditioning art.

In certain instances it may be desired to provide the tank 26 with a source of constant replenishment of water, such as a water supply pipe and a float operated valve to maintain a constant water level in the tank, however such application is old and is well known in the art, hence is not shown, as it forms no part of the present invention.

The rate of evaporation of water from the tank 26 will of course vary with atmospheric conditions, such as temperature and humidity, as well as the length of the operating work day.

In practice it is found that wire mesh screen provides an ideal evaporating surface for it presents a large cooling surface, does not rot or otherwise become fouled with decadent material, it is readily cleaned, and is rigid enough to provide the necessary resistance to the on-coming current of air to effect rotation of the drum and vanes in the manner contemplated.

For the sake of simplicity of disclosure, applicant shows all of the vanes as being driven by the current of air from the impeller 30. It is quite obvious that a separate power unit, through the use of speed reduction gears could be employed to rotate the vanes, either as separate units or as a group unit in such manner as will effect the maximum result in conditioning the air in the manner contemplated.

In the modified form of construction shown in Figure 8, the device 10 of this invention is shown as being mounted under the cowling of an automobile, which is illustratively referred to as being typical of driven vehicles, and wherein the wind developed by motion of the vehicle is properly directed, as through cowling ventilator 60, to pass over the turn of the evaporating surface, from which the cooled air passes into the interior of the vehicle. Details of construction naturally vary with the type of vehicular installation, hence only such detail as may be necessary to operate the invention are shown in the drawings.

It is obvious that various changes and modifications and variations may be made in practicing the invention in departure from the particular showing of the drawings and description, as given, without however, departing from the true spirit of the invention as defined by the scope of the appended claim.

A rotatable evaporating surface for air conditioning apparatus, said evaporating surface comprising a hub, a length of metallic screen, one end of said screen being soldered to said hub, a substantially rectangular base screen spacer angularly positioned on said hub and spaced from said soldered screen and hub connection to initially space said screen from said hub, and other base screen spacers, said other base screen spacers being adapted to space a first turn of said screen from contact with said hub, and rectangular spacers, said rectangular spacers being superposed upon convolutions of screen wound around said hub and upon and in vertical alignment with said base screen spacers whereby a plural number of spaced turns of screen are formed upon said hub, said spacers and said screen being soldered with respect to each other and with respect to said hub to form a rigid unit, a housing for said evaporating surface whereby said evaporating surface may be rotated, means to create an air current to flow over said evaporating surface, means to wet said evaporating surface, said angularly positioned spacers forming vanes to effect rotation of said evaporating surface when an air current is directed thereagainst.

MORRILL N. FARR.